(12) United States Patent
Ushiwata et al.

(10) Patent No.: US 7,387,058 B2
(45) Date of Patent: Jun. 17, 2008

(54) MITER SAW HAVING LIGHT BEAM PROJECTION DEVICE

(75) Inventors: Shigeharu Ushiwata, Hitachinaka (JP); Ryuichi Imamura, Hitachinaka (JP); Takashi Ozawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 477 days.

(21) Appl. No.: 10/796,032

(22) Filed: Mar. 10, 2004

(65) Prior Publication Data

US 2004/0182215 A1  Sep. 23, 2004

(30) Foreign Application Priority Data

Mar. 20, 2003  (JP) .................. P2003-076843

(51) Int. Cl.
*B26D 7/00* (2006.01)

(52) U.S. Cl. .................. 83/520; 83/521; 83/522.15; 362/90; 362/259

(58) Field of Classification Search ............... 83/521, 83/520, 522.15, 432, 581, 468.3, 522.16, 83/522.17, 522.24, 522.25; 362/259, 285, 362/287, 289, 89, 90
See application file for complete search history.

(56) References Cited

U.S. PATENT DOCUMENTS

| 4,553,462 A * | 11/1985 | Silken ................... 83/471.3 |
| 5,375,495 A | 12/1994 | Bosten et al. |
| 5,996,460 A * | 12/1999 | Waite ...................... 83/520 |
| 6,481,322 B1 * | 11/2002 | Hsiung .................... 83/521 |
| 6,497,168 B1 * | 12/2002 | Levine .................... 83/520 |
| 6,578,459 B2 * | 6/2003 | Waite ...................... 83/13 |
| 6,755,107 B2 * | 6/2004 | Peot et al. ............... 83/478 |
| 2004/0083869 A1 * | 5/2004 | Aziz et al. .............. 83/520 |

FOREIGN PATENT DOCUMENTS

JP  2000-225603  8/2000

* cited by examiner

*Primary Examiner*—Boyer D. Ashley
*Assistant Examiner*—Omar Flores Sánchez
(74) *Attorney, Agent, or Firm*—Antonelli, Terry, Stout & Kraus, LLP

(57) ABSTRACT

A miter saw including a base, a turntable, a cutting unit rotatably supporting a circular saw blade, and a support unit movably supporting the cutting unit at a position above the turntable. The support unit has a hinge formed with a recess in which a laser oscillator is accommodated. The laser oscillator emits a projected beam line on a surface of a workpiece W. The line indicates the position of a circular saw blade tip and its extension in a diametrical direction of the circular saw blade. The opening of the recess is closed with a cover that has an opening for allowing the laser beam to pass therethrough. The cover is positioned in confrontation with a fence on which the workpiece abuts for positioning. One surface of the cover is finished into a mirror surface which reflects a cutting line marker already marked on the workpiece and reflects a projected beam line.

16 Claims, 10 Drawing Sheets

MITER SAW HAVING LIGHT BEAM PROJECTION DEVICE

BACKGROUND OF THE INVENTION

The present invention relates to a miter saw, and more particularly to a miter saw provided with a light-projecting device such as a laser oscillator for projecting a projection line indicative of a cutting position of a saw blade on a workpiece.

FIG. 17 illustrates a conventional miter saw. As shown in FIG. 17, the miter saw includes a base 702, a fence 703, a turntable 710, a cutting unit 720, a support unit 730, and a laser oscillator 751. The turntable 710 is rotatably mounted on the base 702 for supporting thereon a workpiece W in cooperation with the base 702. The fence 703 is secured to the base 702 and extends across the turntable 710. The fence 703 has a positioning surface to which the workpiece W is abutted for positioning the workpiece W. The cutting unit 720 has a circular saw blade 721. The support unit 730 movably supports the cutting unit 720 at a position above the turntable 710. The laser oscillator 751 is mounted on the support unit 730. The laser oscillator 751 emits a laser beam onto the workpiece W in order to indicate the position of the tip of the blade 721 and its extension position as a line on the surface of the workpiece W. The laser oscillator 751 is fixed to a given position so that a part of or entire laser beam can travel below the circular saw blade 721 and illuminate the surface of the workpiece W without being interrupted by the blade 721 when the blade 721 is at its uppermost position. The turntable 710 may be rotated to bring the laser beam into alignment with a marker (indicating a cutting line) already drawn on the workpiece W. Thus, the miter saw can cut the workpiece W precisely along the marker. A miter saw of this type is disclosed in for example laid open Japanese Patent Application Publication No. 2000-225603.

If the workpiece W has a rectangular cross-section as shown in FIG. 17, a user who stands in front of the miter saw can easily see whether or not the laser beam irradiated on an upper surface of the workpiece W is aligned with the cutting line marker delineated on the upper surface of the workpiece W. On the other hand, if the workpiece W has such an irregular cross-section as illustrated in FIG. 18, the user cannot provisionally draw a cutting line marker on the upper surface of the workpiece W. In the latter case, the user draws a cutting line marker M2 or M3 (see FIG. 7) on a vertical side of the workpiece W in contact with the fence 703. Then, the user rotates the turntable 720 and brings the blade 721 into alignment with the line marker M2 or M3 before the user starts cutting the workpiece W. To align the blade 721 with the line marker M2 or M3, the user needs to walk around to the back of the miter saw and bow or stoop his head to see both the line marker M2 or M3 and the laser beam at the rear vertical side of the workpiece W. This would be troublesome, lowering the efficiency of sawing the workpiece W.

SUMMARY OF THE INVENTION

The present invention has been made in view of the foregoing deficiency, and it is an object of the present invention to provide a miter saw with which a user can align the laser beam with the cutting line marker marked on the side of a workpiece facing with a fence without changing a cast or eye of the user standing in front of the miter saw and without walking around to the back of the miter saw for observing the marked side of the workpiece.

This and other object of the present invention will be attained by a miter saw including a base, a fence, a cutting unit, a support unit, a light projecting device, and, a mirror. The fence is secured to the base and has an abutment surface on which a side of a workpiece abuts for positioning the workpiece on the base. The cutting unit supports a circular saw blade which provides a plurality of blade tips. The support unit movably supports the cutting unit above the base. The light projecting device forms a projected line on the workpiece, the line being indicative of a position of a tip of the circular saw blade and a position of an extension of the tip in a diametrical direction of the circular saw blade. The mirror is provided at a position in confrontation with the side of the workpiece in abutting contact with the abutment surface of the fence for reflecting the projected line which is projected on the side of the workpiece and for allowing a reflected line image to be observed from a side of the abutment surface of the fence.

DETAILED DESCRIPTION OF THE PREFERRED EMBODIMENTS

Figure 1:
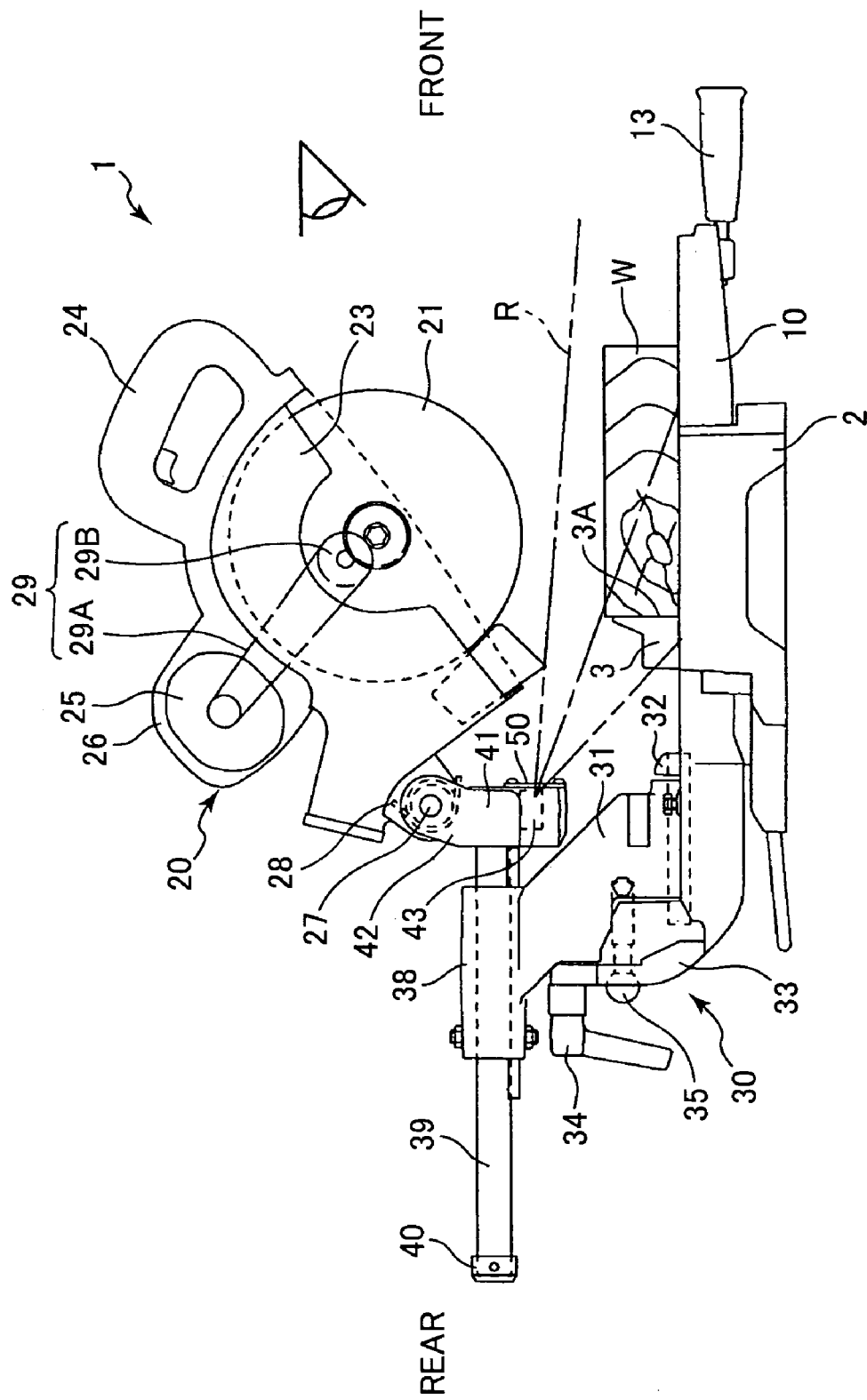
FIG. 1 is a side view of a miter saw according to a first embodiment of the present invention.

A miter saw according to a first embodiment of the present invention will be described with reference to FIG. 1 to FIG. 8. The miter saw 1 generally includes a base 2, a turntable 10, a cutting unit 20, and a support unit 30. The turntable 10 is rotatably mounted on the base 2 for mounting thereon a workpiece in cooperation with the base 2. The cutting unit 20 holds a circular saw blade 21. The support unit 30 extends from the turntable 10 for movably supporting the cutting unit 20 at a position above the turntable 10. The turntable 10 is embedded in the center part of the base 2 and is rotatable in a horizontal plane. An upper surface of the turntable 10 is flush with an upper surface of the base 2. A workpiece W such as a wood and lumber can be placed on the upper surface of the base 2 and the turntable 10. A fence 3 extending along a diameter of the turntable 10 is secured to the upper surface of the base 2. The fence 3 has an abutment surface 3A on which the workpiece W is abuttable for setting the workpiece W at a desired position. The fence 3 is constituted by a pair of fence bodies each inner end being spaced away from each other for avoiding mechanical interference between the circular saw blade 21 and the fence 3.

The turntable 10 includes a disc shaped table section 11 and an operation section 12 extending forwards from the table section 11 in a diametrical direction thereof. A knob handle 13 is fastened to a front end of the operation section 12. A user can grips the knob handle 13 and move it sideways to rotate the table section 11 about its axis with respect to the base 2. A pair of blade guides 14 is secured partly on the upper surface of the table section 11 and partly on the upper surface of the operation section 12. The blade guides 14 extend parallel to each other and spaced apart from each other defining a slit S therebetween The slit S extends in the diametrical direction of the table section 11 and allows the circular blade tip to be entered therein. Rear ends of the blade guides 14, i.e., the rear end of the slit S, are closer to the support unit 30 than the abutment surfaces 3A of the fences 3 to the support unit 30. Therefore, the rear end of the slit S always positioned in the gap between the inner ends of the fence bodies irrespective of the rotational direction and rotational amount of the turntable 10.

The operation section 12 takes its initial position when the operation section is directed in a direction perpendicular to the fence 3 as illustrated in FIG. 1. With this state, the saw blade 21 cuts the workpiece W along a line that intersects at right angles with the fence 3. On the other hand, if the turntable 10 is angularly rotated from the initial position, the saw blade 21 cuts the workpiece W along a line that intersects at an acute angle (or an obtuse angle) with the fence 3. In the latter case, the miter saw 1 performs so-called "angled cutting" on the workpiece W.

Figure 2:
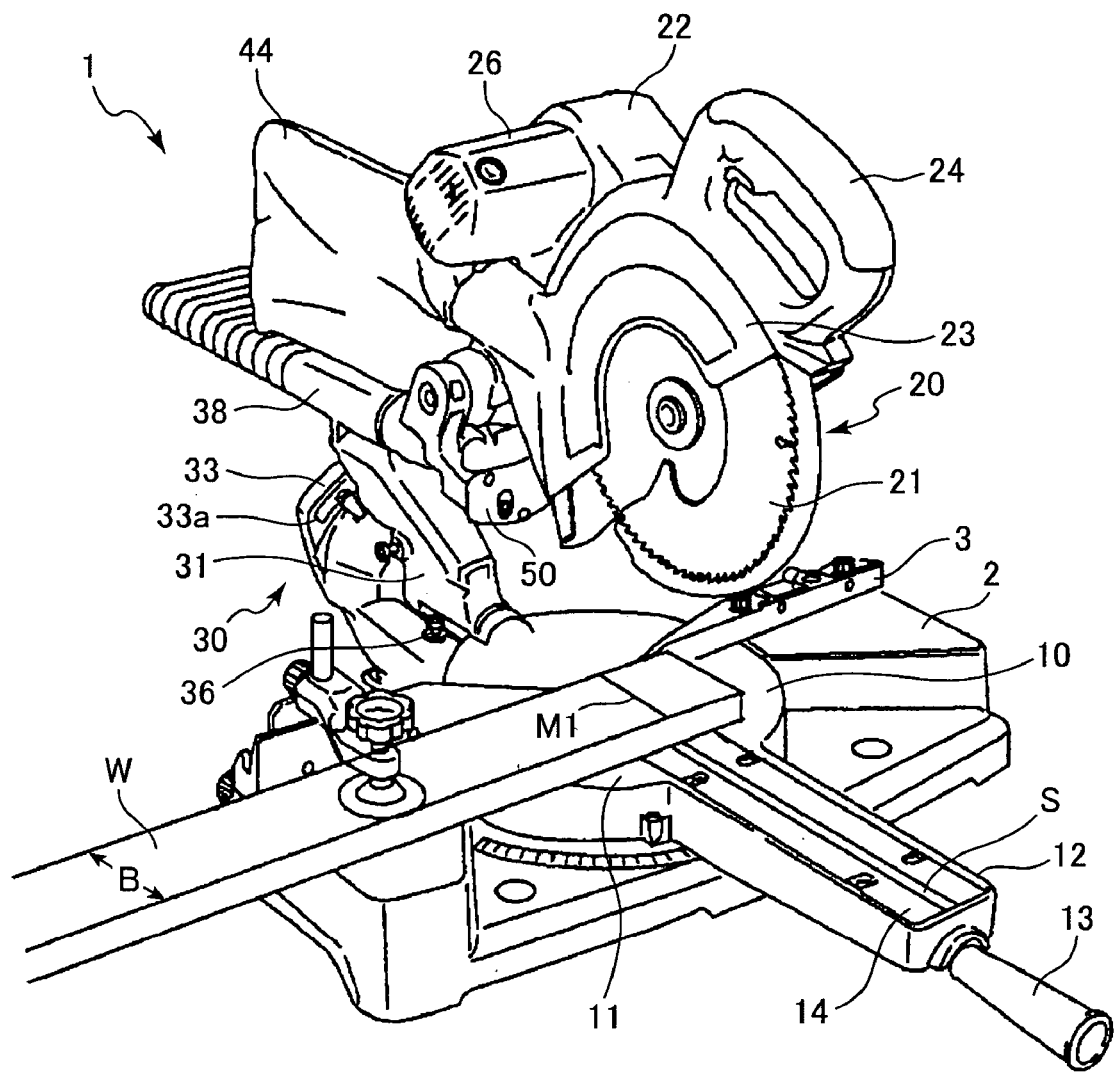
FIG. 2 is a perspective view of the miter saw according to the first embodiment, showing a workpiece setting state on the base of the miter saw.
Figure 3:
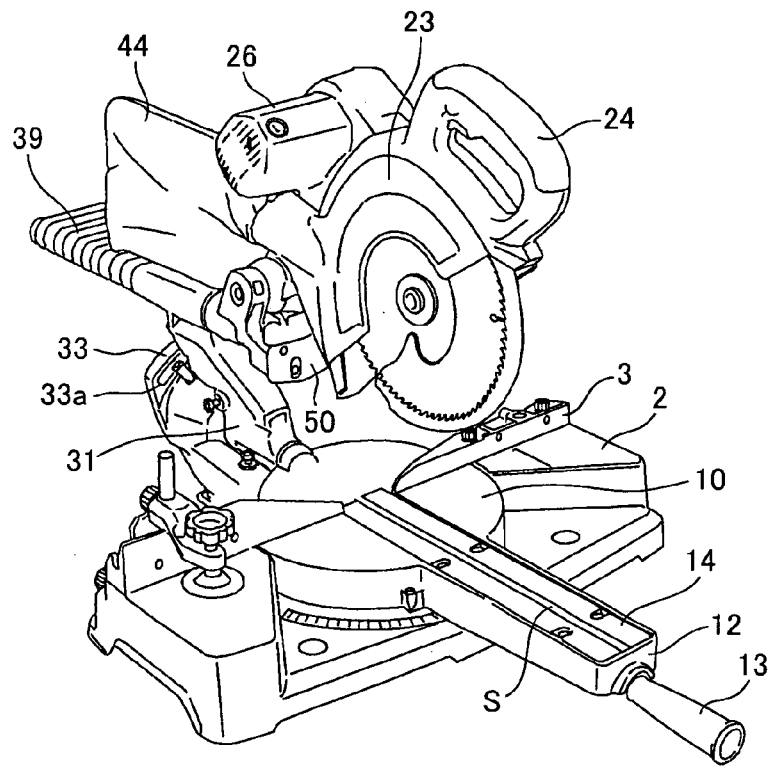
FIG. 3 a perspective view of the miter saw according to the first embodiment, with no workpiece set on the base of the miter saw.
Figure 4:
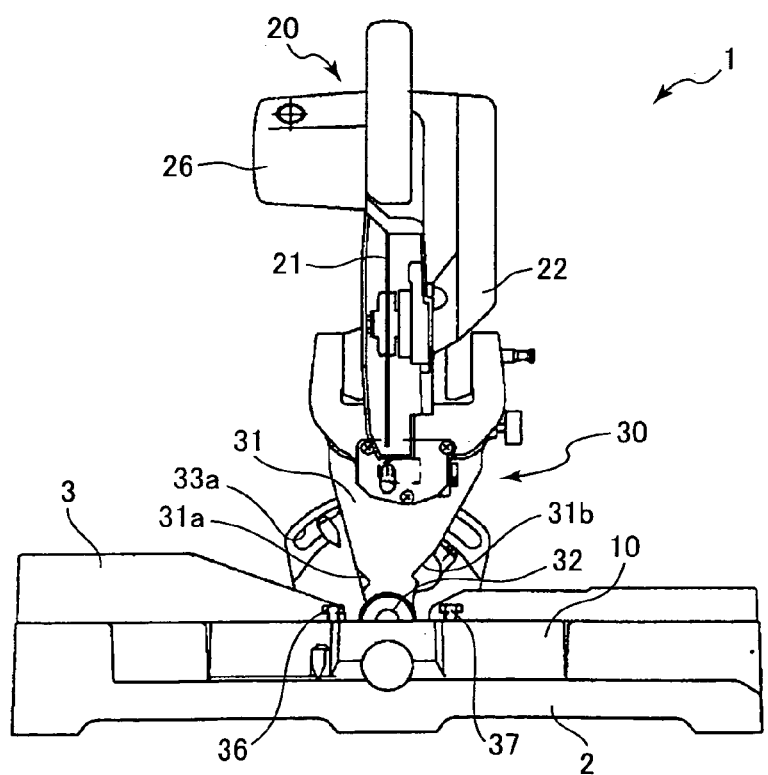
FIG. 4 is a rear view of the miter saw according to the first embodiment of the invention.
Figure 5:
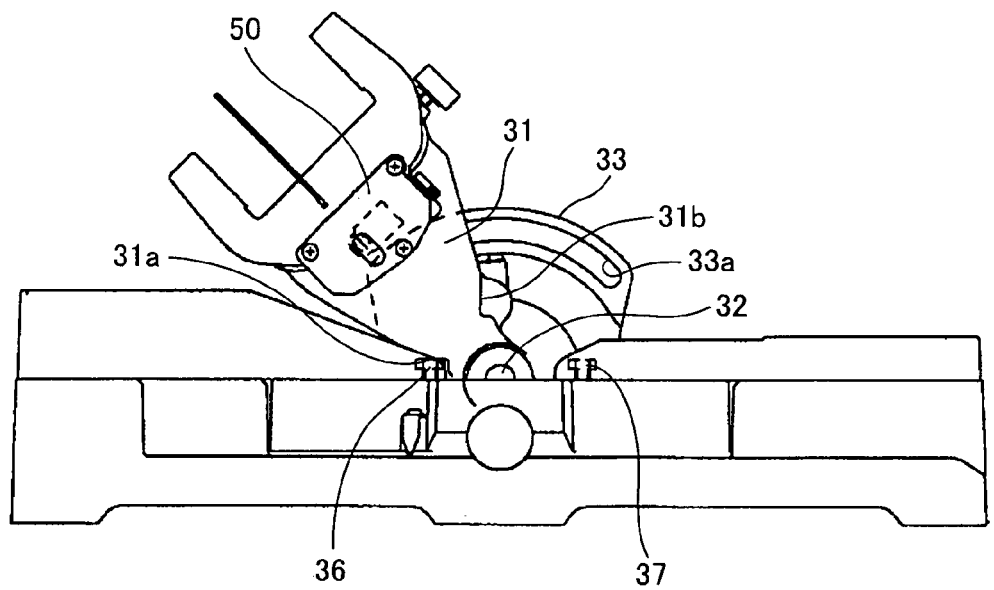
FIG. 5 is a partial front view of the miter saw according to the first embodiment, showing the saw blade set in a tilted posture.

The support unit 30 generally includes a holder 31, a holder shaft 32, a bracket 33, a clamp lever 34, a pair of slide shafts 39, and a hinge 41 pivotally movably supporting the cutting unit 20. The slide shaft 39 and the hinge 41 constitute a sliding section. The holder 31 upstands from the rear end portion of the turntable 10 through the holder shaft 32. The holder shaft 32 is so positioned that its axis extends almost in the upper surface of the turntable 10. The holder 31 is pivotally movably supported about the holder shaft 32 so that the holder 31 is tiltable leftward or rightward toward the upper surface of the turntable 10. As shown in FIGS. 2 and 4, the bracket 33 upstands from the rear end of the turntable 10 at a position behind the holder 31. The bracket 33 is formed with an arcuate slot 33a whose center is coincident with the axis of the holder shaft 32. The clamp lever 34 has a shaft portion 35 which extends through the arcuate slot 33a. The clamp lever 34 is manipulated to change the fastening position of the shaft portion 35 to the holder 31. Thus, a leftward or rightward tilting angle of the holder 31 about the axis of the holder shaft 32 can be controlled. The holder 31 has notches 31a and 31b in the lower-left and lower-right sides thereof. Further, adjustment screws 36 and 37 in threading engagement with the turntable 10 are provided at positions in abutting relation to the notches 31a and 31b, respectively. The adjustment screws 36 and 37 can be turned to change the heights of screw heads while the clamp lever 34 remains open so as to change abutment position between the notch 31a or 31b and the head of the screw 36 or 37. Thus, tilting angle of the holder 31 can be adjusted. Upon fixing the tilting angle of the holder 31 at a specific angle, the circular saw blade 21 is tilted at the same angle to perform so called "slant cutting".

A tubular slide-shaft support 38 is provided integrally with the upper end of the holder 31 for slidably movably supporting a pair of slide shafts 39 in parallel to each other in the frontward/rearward direction. A stop member 40 straddles the rear end portions of the slide shafts 39 for regulating the frontmost position of the slide shaft 39. The hinge 41 has an intermediate position fixed to the front ends of the slide shafts 39. The hinge 41 has an upper end portion provided with a support section 42 for hingedly supporting the cutting unit 20. The hinge 41 has a lower portion provided with a laser oscillator receptacle 43.

The cutting unit 20 has a gear case 22 for detachably and rotatably supporting the circular saw blade 21. The cutting unit 20 also includes a blade guard 23, a handle 24, and a motor housing 26 those formed integrally with the gear case 22. The gear case 22 holds a pivot shaft 27 rotatably supported to the support section 42 of the hinge 41. The blade guard 23 covers an upper half of the circular saw blade 21. The handle 24 is located at a front side of the blade guard 23. The motor housing 26 is provided at the rear side of the handle 24 and accommodates therein a motor 25. The pivot shaft 27 extends almost parallel to a rotation axis of the circular saw blade 21. Thus, the cutting unit 20 has a pivot axis extending substantially parallel to the axis of the blade 21. Thus, the cutting unit 20 is pivotably supported to the support unit 30 through the pivot shaft 27. The motor housing 26 can be positioned at the top of the blade guard 23 when the gear case 22 lowers to the workpiece W so that the blade 21 can cut the workpiece W. A torsion spring 28 is wound around the pivot shaft 27 and is interposed between the gear case 22 and the hinge 41 for biasing the gear case 22 upwardly. The gear case 22 accommodates therein a transmission mechanism 29 including an endless belt 29A and a pulley 29B for transmitting rotation of the motor 25 to the circular saw blade 21. A dust bag 44 is removably fastened to the blade guard 23 and communicates with the space between the gear case 22 and the blade guard 23 for collecting cutting chips into the dust bag 44.

Figure 6:
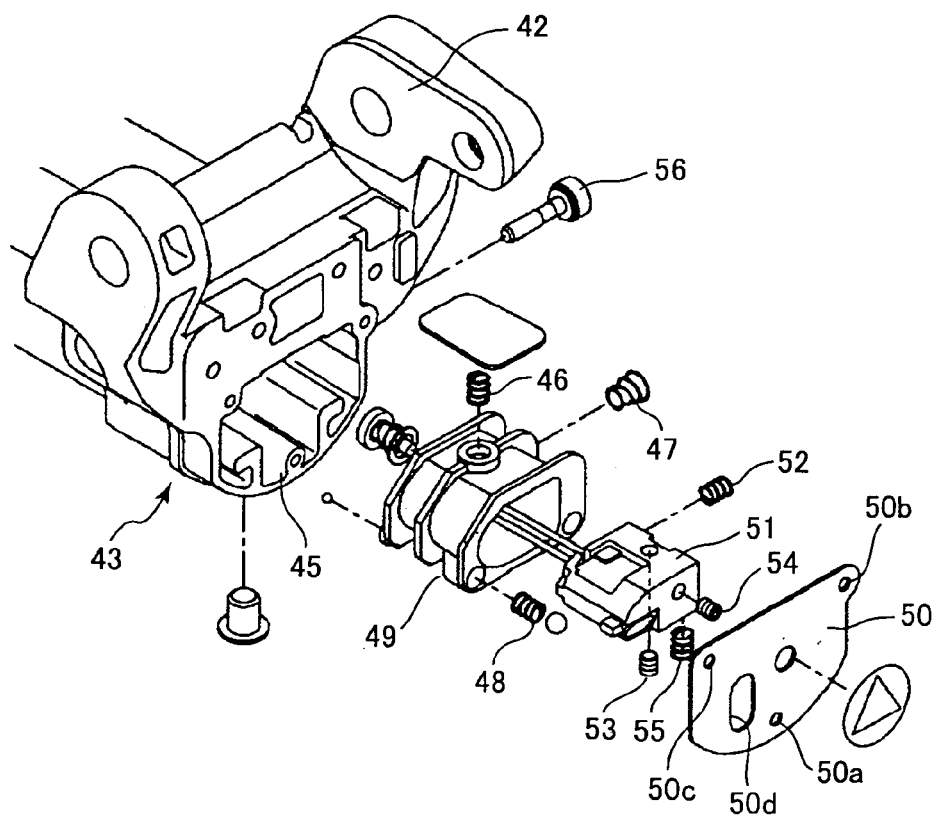
FIG. 6 is an exploded perspective view illustrating an assembling manner of a laser oscillator according to the first embodiment.

The laser oscillator receptacle 43 provided in the lower end of the hinge 41 is shown in FIG. 6. The laser oscillator receptacle 43 has a recess 45, a laser oscillator mount 49, and a cover 50. The recess 45 opens at a position in confrontation with the fence 3. The laser oscillator mount 49 is positioned in the recess 45 and is movably supported therein through coil springs 46, 47 and 48. The cover 50 is adapted for closing the recess 45. A laser oscillator 51 functioning as a light-projecting device is movably mounted in the laser oscillator mount 49 through coil springs 52 to 55. That is, the laser oscillator 51 can move up and down, and left to right and vice versa within the laser oscillator mount 49. An adjuster 56 is provided to the hinge 41. The adjuster 56 has a knob portion accessible to the user and an inner end urging the laser oscillator 51. Upon manipulation of the adjuster 56, a lateral position of the laser oscillator 51 can be adjusted.

Figure 7:
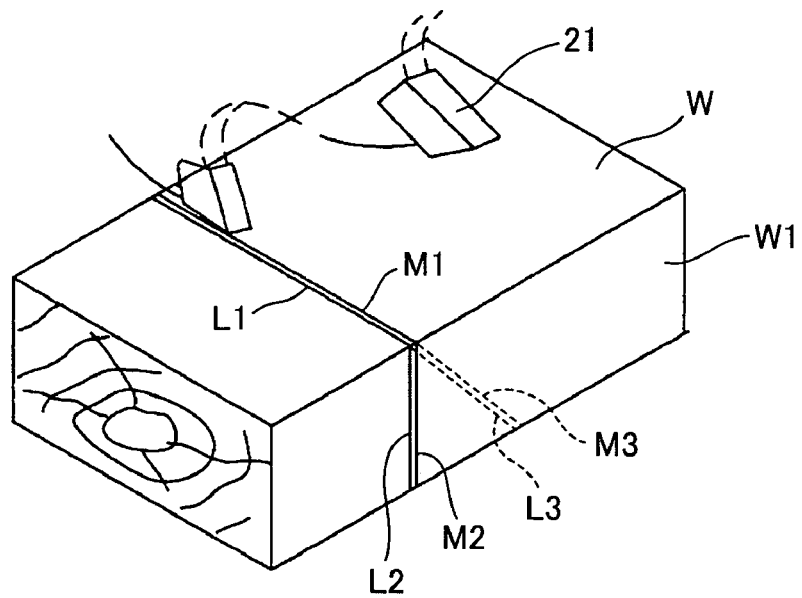
FIG. 7 is a view for description of the positional relation between the laser beam and the cutting line marker marked on a workpiece.

A light-projecting part of the laser oscillator 51 is so adjusted in position that the laser beam R (FIG. 1) defines irradiation lines L1 and L2 (FIG. 7) that can pass immediately beside the tip of the circular saw blade 21 as illustrated in FIG. 7. As best shown in FIG. 1, the laser oscillator 51 is so positioned that the laser beam R can extends below the circular saw blade 21 when the cutting unit 20 lies at its uppermost position. The beam R emitted from the laser oscillator 51 forms the lines L1 and L2 on the workpiece W, and the lines L1 and L2 is indicative of position of the saw blade tip or its extension position. In FIG. 7, M1 and M2 denote cutting line markers marked on the workpiece W beforehand, and W1 designates the abutment surface of the workpiece W which abuts on the fence 3. In the embodiment shown in FIG. 7, the cutting lines L1 and L1 have prescribed thickness, and each right edge of the line L1, L2 is in alignment with the cutting line markers M1 and M2, respectively in FIG. 7.

The cover 50 is formed with screw holes 50a to 50c so that the cover 50 can be secured to an open end of the recess 45 with screws (not shown). The cover 50 is also formed with an opening 50d for allowing the laser beam emitted from the laser oscillator 51 to pass therethrough. The outer surface of the cover 50 is finished into a mirror surface and can therefore serve as a mirror. The cover 50 is made from a material such as stainless steel capable of providing a sufficient mechanical strength to hold the laser oscillator 51 and also providing a mirror function. To function as a mirror, the surface of the cover 50 is subjected to polishing. Since the cover 50 functions as a mirror, a separate mirror is not required, which can reduce the number of components.

With the arrangement described above, the workpiece W is mounted on the table 10 in a state where the slide shafts 39 are positioned at their rearmost position and the turntable 10 is set at its initial position. The workpiece W has a relatively large width B in a longitudinal direction of the slit S and cutting line markers M1 and M2 (FIG. 7) have been marked as shown in FIG. 7. Then, the workpiece W is adjusted in position by abutting one side W1 (FIG. 7) of the workpiece W on the abutment surface 3A of the fence 3. Incidentally, the cutting line marker M1 is marked on the upper side of the workpiece W and extends at right angles to the side W1 of the workpiece W. On the other hand, the cutting line marker M2 is marked on the side W1 and extends at right angles to the upper side of the workpiece W. In this state, the user who is standing in front of the miter saw 1 can observe an image of the cutting line marker M2 reflected in the mirror 50 as well as the cutting line marker M1 marked on the upper side of the workpiece W without being moved to backside of the miter saw 1.

Figure 8:
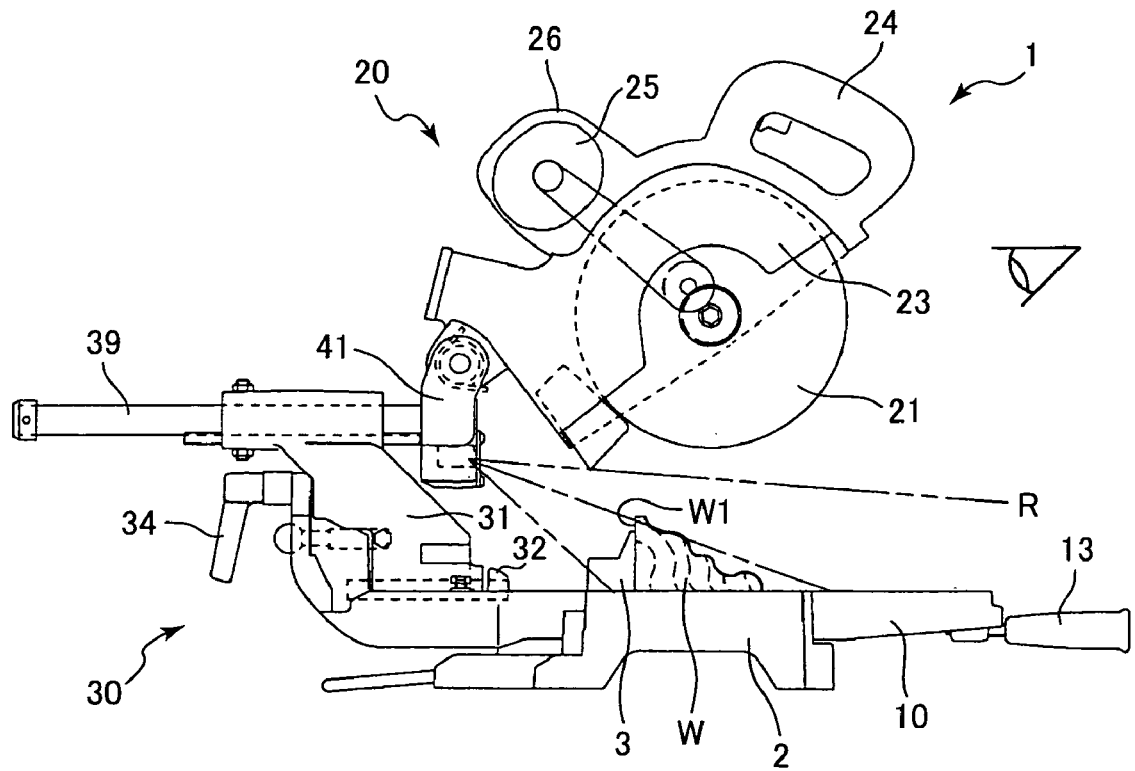
FIG. 8 is a side view of the miter saw according to the first embodiment, depicting a laser beam irradiation manner for cutting a workpiece having an irregular cross-section.

The laser beam R emitted from the laser oscillator 51 forms lines L1 and L2 on the workpiece W. The user moves the workpiece W on the table section 11 so as to bring the cutting line marker M1 into alignment with the line L1. Alternatively, the user can move the workpiece W to align the line marker M2 with the beam line L2 those reflected in the mirror 50. If the workpiece W has an irregular upper side not flat or horizontal as shown in FIG. 8, no cutting line marker (corresponding to the marker M1) can be provisionally marked on the upper side and only the cutting line marker M2 can be provisionally marked on the vertical side W1 that abuts on the fence 3. In the latter case, the user cannot perform alignment operation between the line L1 and the marker. Nonetheless, the user can move the workpiece W so as to align the cutting line marker M2 with the line L2 with reference to the images of the marker M2 and the line L2 those reflected in the mirror 50.

After aligning the cutting line marker M with the line L the user holds the handle 24 and pulls the handle 24 downward against the biasing force of the torsion spring 28. Thus, the cutting unit 20 is pivotally moved downward about the pivot shaft 27 for pivotally moving the circular saw blade 21 downward to start cutting operation to the workpiece W. If the user pulls the handle 24 frontward, then the slide shafts 39 slidingly moves forward with respect to the slide-shaft support 38 for moving the saw blade 21 forwardly to cut the workpiece W along the cutting line marker M1. Incidentally, to perform the angled cutting on the workpiece W, the user first rotates the turntable 10 by a desired angle from the initial position. Then, the user moves the workpiece for aligning the cutting line marker M with the line L, and then performs the above described cutting operation.

To perform the slant cutting, an inclining marker line M3 is marked on the side W1 of the workpiece W. As shown in FIG. 7, this line marker M3 extends from one end of the cutting line marker M1 marked on the upper side of the workpiece W. The user loosens the clamp lever 34, enabling the holder 31 to be pivotally moved about the holder shaft 32. Then the user tilts the circular saw blade 21 for aligning the extension line of the tip of the blade 21 with the inclined cutting line marker M3 that lies in the rear end of the slit S of the blade guides 14. Since the laser beam draws a line L3 on the side W1 of the workpiece W is indicative of the position of the circular saw blade tip, the alignment operation of the cutting line marker M3 with the line L3 determines intended inclination of the circular saw blade 21. When the line L3 comes into alignment with the line marker M3, the user tightens the clamp lever 34 for fixing the tilting angle of the holder 31 and, hence, fixing the tilting angle of the circular saw blade 21 at a desired inclined position. Thus, the circular saw blade 21 can be aligned with the cutting line marker M3. With the miter saw 1 described in the embodiment, angled cutting can be combined with the slant cutting. In this case also, the user can observe the laser beam projection line and the cutting line marker marked on the side W1 of the workpiece W through the mirror 50.

Since the cover serving as the mirror 50 is positioned in confrontation with the rear end of the slit S, i.e., in confrontation with the abutment side W1 of the workpiece W abuttable on the fence 3, the line L2 or L3 (laser beam) projected on the abutment side W1 can be observed by the reflection in the mirror 50, even if the workpiece W has an irregular cross-section. In other words, the user can observe not only the cutting line markers M2 or M3, but also the projected line L2 or L3 those reflected in the mirror 50 from the front of the miter saw 1, that is, from the workpiece abutment side 3A of the fence 3. Accordingly, the user need not walk around the miter saw 1 and bow in order to observe the projected line L2 or L3. Thus, the mirror 50 enables the user to confirm the position of the projected line on one side W1 (FIG. 7) of the workpiece W and the positional relation between the projected line and the cutting line marker so as to facilitate the coincidence of the projected line with the marker. This enhances the efficiency of sawing the workpiece W.

Further, the mirror 50 is attached to the hinge 41 of the support unit 30. Namely, the mirror 50 is provided on a component that moves together with the circular saw blade 21 toward and away from the base 2. The mirror 50 moves as the turntable 10 is rotated. Hence, the user can observe any line drawn on the abutment side W1 of the workpiece W through the mirror 50 irrespective of the rotation of the turntable 10.

Further, the laser oscillator 51 is positioned in confrontation with the abutting side W1 of the workpiece W which abuts on the fence 3. Thus, the laser beam can be directly irradiated onto the abutting side W1 and upper side of the workpiece W if the workpiece W is a block. Accordingly, the user can easily recognize the cutting position.

Further bulk of the motor housing 26 protrudes in the direction of thickness of the circular saw blade 21. Nonetheless, the motor housing 26 does not conceal the mirror 50 because the motor housing 26 is disposed at the top of the blade guard 23. Thus, the mirror 50 is always visible regardless of the vertical position of the cutting unit 20.

Further, since the vertical level of the mirror 50 is lower than the handle 24, the mirror 50 can be always observed regardless of the position of the handle 24. If the mirror 50 were located above the handle 24, the handle 24 should conceal the mirror 50 as the handle is moved up and down. The mirror 50 is not concealed because the mirror 50 is positioned below the handle 24.

Further, as described above, the mirror 50 is positioned in confrontation with the abutting side of the workpiece W abutting the fence 3, and the mirror 50 is attached to the hinge 41 fixed to the front end of the slide shaft 39 movable frontward/rearward. Therefore, the mirror 50 can be moved toward and away from the workpiece W. A desired surface area of the workpiece can be reflected in the mirror 50 by way of the movement of the mirror 50 toward and away from the workpiece W in accordance with the size of the workpiece.

Further, the mirror 50 opposes the abutting side of the workpiece W abutting on the fence 3, the mirror 50 can reflect an image of the rear end of the slit S. Thus, the position of the tip of the circular saw blade 21 and inclination angle of the tip relative to the workpiece W can be recognized by an image of the rear end of the slit S reflected on the mirror 50 prior to actual cutting operation, since the tip of the circular saw blade 21 must be entered into the slit S in the actual cutting operation. The rear end of the slit S reflected in the mirror 50 can end of the slit S reflected in the mirror 50 can serve as a reference position. In view of this, the mirror 50 is useful in the case where the laser oscillator 51 fails to work. This mirror 50 is also useful in a miter saw that have no laser oscillator.

Figure 9:
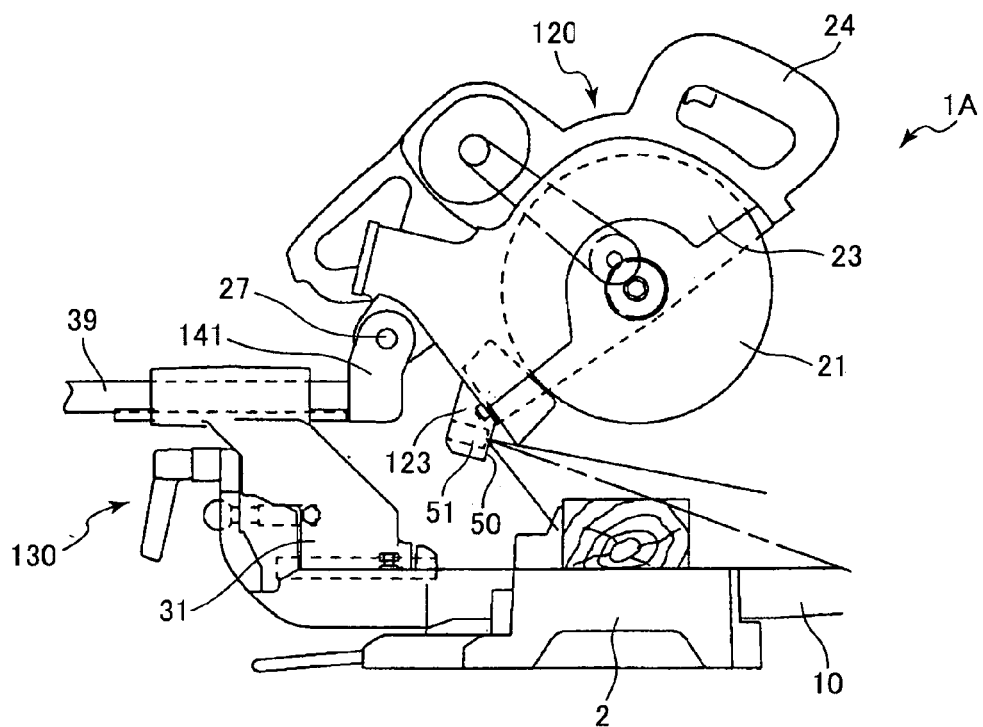
FIG. 9 is a partial side view showing a miter saw according to a second embodiment of the present invention.

A miter saw according to a second embodiment of the present invention will next be described with reference to FIG. 9, wherein like parts and components are designated by the same reference numerals as those shown in the first embodiment for eliminating duplicating description. Further, any components equivalent to those components of the first embodiment are denoted at numerals greater than 100 than the reference assigned to their equivalences of the first embodiment.

A miter saw 1A according to the second embodiment differs from the first embodiment in that the laser oscillator 51 and the cover 50 functioning also as a mirror are not secured to a hinge 141 of a support unit 130, but is secured to the saw guard 23. More specifically, an attachment unit 123 is provided on the back of the saw guard 23 that constitutes a cutting unit 120. The laser oscillator 51 is provided in the attachment unit 123 in a manner the same as that shown in FIG. 6, and the cover 50 is attached at an open front end portion of the attachment unit 123.

With this arrangement, the mirror 50 is mounted on the cutting unit 120 that can move toward and away from the base 2. Hence, the mirror 50 is movable concurrently with the rotation of the turntable 10. Therefore, the mirror 50 can reflect the cutting line marker marked on the abutting side of the workpiece. Thus, the user can visually recognize the position of the cutting line easily, in whichever direction the turntable 10 is rotated. Remaining advantages of the second embodiment are the same as those of the first embodiment.

Figure 10:
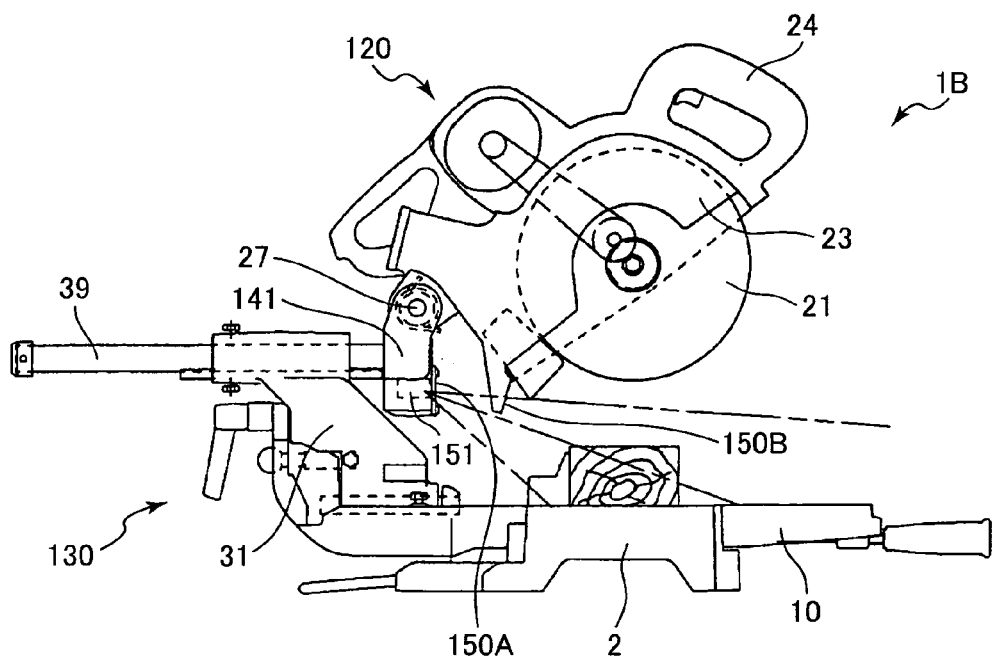
FIG. 10 is a side view of a miter saw according to a third embodiment of the present invention.

A miter saw according to a third embodiment of this invention is shown in FIG. 10. This miter saw 1B is similar to the first embodiment in that the laser oscillator 51 is provided in the recess of a hinge 141 and that a cover 150A closes the recess. However, the cover 150A does not function as a mirror. Instead, a separate mirror 150B is located at the back of the cutting unit 120 at a position in confrontation with the abutting side W1 of the workpiece W abutting on the fence 3. Since the cover 150A does not function as a mirror, various kind of material is available as a material of the cover 150A. Further, the separate mirror 150B can be made from an optimum material that can provide a desirable mirror function. The other advantages of the third embodiment are the same as those of the first and second embodiments.

FIGS. 11 to 14 show miter saws according to fourth to seventh embodiments of the present invention. These embodiments have no slide shafts 39 or any components associated therewith, unlike the first to third embodiments. Instead, in the fourth to seventh embodiments, the moving direction of the cutting unit is limited only to pivotal up and down direction with respect to the turntable.

Figure 11:
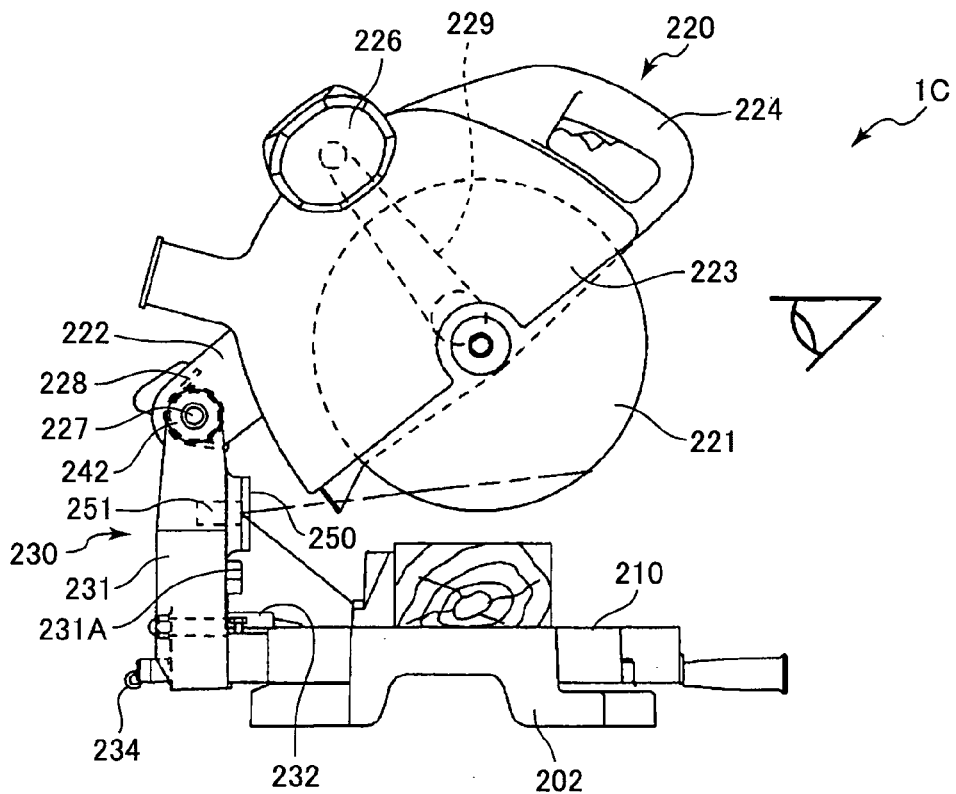
FIG. 11 is a side view of a miter saw according to a fourth embodiment of the present invention.

In a miter saw 1C illustrated in FIG. 11, which is the fourth embodiment of the invention, a cutting unit 220 is similar to the cutting unit 20 of the first embodiment. On the other hand, a support unit 230 includes a holder 231, a holder shaft 232, a clamp lever 234, a V-shaped projection 231A, and a pair of stop bolts (not shown). The holder 231 stands upright at a rear side of a turntable 210 and is fastened to the turntable 210 by the holder shaft 232. The axis of the holder haft 232 lies in almost the same plane as the upper surface of the turntable 210. Thus, the holder 231 is pivotally movable leftward and rightward about the holder shaft 232, with respect to the upper surface of the turntable 210.

An arcuate slot (not shown) is formed in the rear portion of the holder 231. A center of the arcuate slot is coincident with the axis of the holder shaft 232. The clamp lever 234 whose tip portion is formed with a male thread extends through the arcuate slot, and the male thread portion is threadingly engaged with a female thread portion formed at a rear side of the turntable 210. When the clamp lever 234 is unfastened, the holder 231 can be pivotally moved about the holder shaft 232 within an arcuate stroke of the arcuate slot. When the clamp lever 234 is fastened, the holder 231 is clamped between the turntable 210 and the clamp lever 234 and is fixed in a desired inclined posture. The arcuate slot has the arcuate stroke capable of performing maximum inclination of 45° C. to the left and the right.

A pivot shaft support 242 is provided at the top of the holder 231 for supporting a pivot shaft 227. Thus, the cutting unit 220 is vertically movably and pivotally connected to the holder 231 through the pivot shaft 227 with respect to the base 202. A torsion spring 228 is interposed between the holder 231 and the cutting unit 220 for biasing the cutting unit 220 upward. The V-shaped projection 231A protrudes from the front side of the holder 231 integrally therewith. The pair of stop bolts (not shown) extend vertically and are threadingly engaged with the turntable 210. The pair of stop bolts are positioned in a moving locus of the V-shaped projection 231A. When the holder 231 is pivotally moved, one outer side of the projection 231A abuts on the head of one stop bolt and is held inclined at a prescribed angle. Thus, inclination of the circular saw blade 221 is set. Generally, the heads of the stop bolts are so adjusted that the projection 231A is brought into abutment with the head when the holder 231 is inclined to the left or the right by 45° C. Incidentally, details of the support unit 230 is described in detail in laid open Japanese Patent Application Publication No. 2000-225603.

In the present embodiment shown in FIG. 11, a laser oscillator 251 is held in a recess formed in the front side of the holder 231, and a cover 250 closes the open end of the recess. The cover 250 functions as a mirror and is formed with an opening for allowing the laser beam to pass therethrough. With this configuration, the mirror 250 is provided on the holder 231 that is a movable component of the support unit 230 with respect to the base 202. Hence, the mirror 250 can move along with the rotation of the turntable 210. This enables the user to confirm the position of the cutting line marker marked on one side of the workpiece as well as the projected line of the laser beam on the one side, because the mirror 250 reflects the cutting line marker and the projected line even during rotation of the turntable 210. The other advantages of the fourth embodiment are the same as those of the foregoing embodiments described above.

Figure 12:
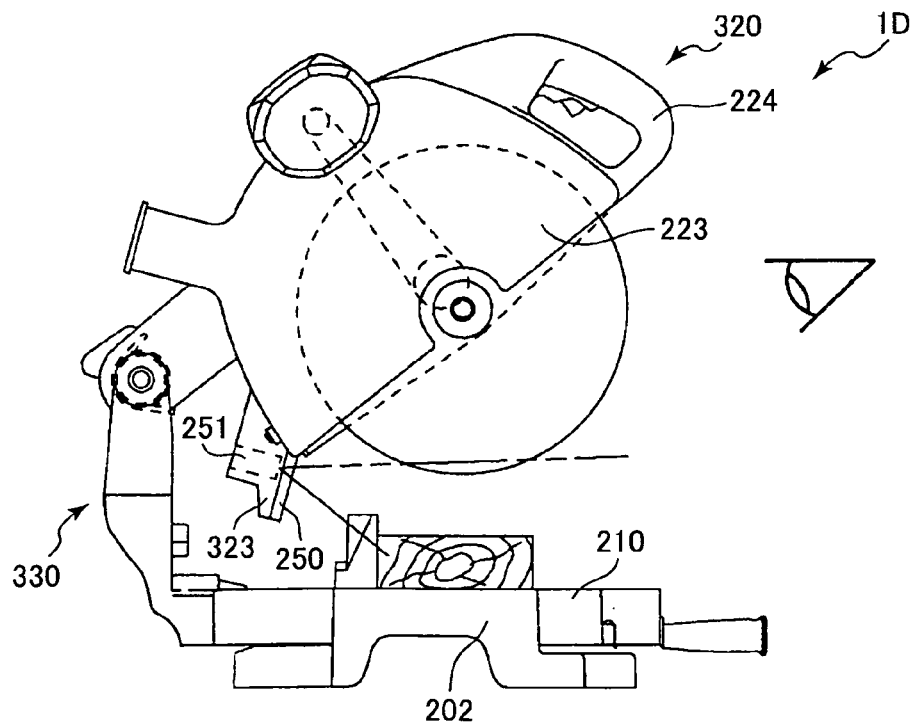
FIG. 12 is a side view of a miter saw according to a fifth embodiment of the present invention.

A miter saw 1D according to a fifth embodiment of the present invention is shown in FIG. 12. Similar to the second embodiment, an attachment unit 323 is provided at the back of the blade guard 223 of a cutting unit 320. The laser oscillator 251 is provided in the attachment unit 323. Further, the cover 250 functioning as a mirror is provided to a front open end portion of the attachment unit 323. In this configuration, the mirror 250 is provided on the support unit 330, that is, on a component that can move toward and away from the base 202. Hence, the mirror 250 moves as the turntable 210 is rotated. This enables the user to confirm the position of the cutting line marker marked on one side of the workpiece, because the mirror 250 reflects the cutting line marker regardless of the rotation of the turntable 210. The other advantages of the fifth embodiment are the same as those of the embodiments described above.

Figure 13:
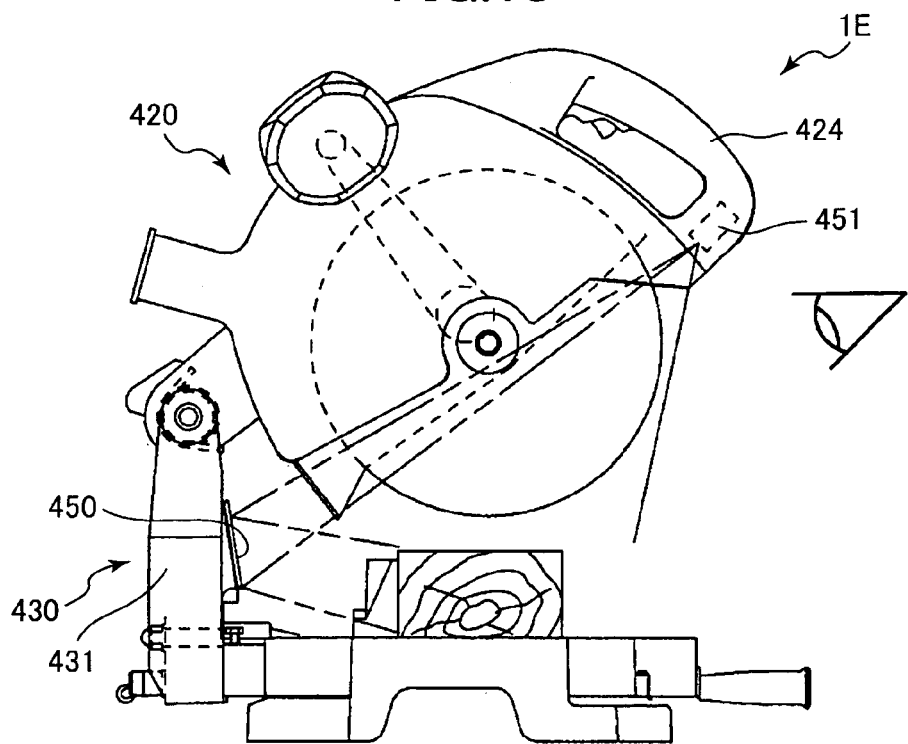
FIG. 13 is a side view of a miter saw according to a sixth embodiment of the present invention.

A miter saw 1E according to a sixth embodiment of the present invention is shown in FIG. 13. A laser oscillator 451 is provided on one side of the front portion of a handle 424 of a cutting unit 420. Further, a mirror 450 is attached to a front end of a holder 431 of a support unit 430 and is positioned in confrontation with the fence. The laser oscillator 451 is adapted for partly directly irradiating a laser beam to an upper surface of the workpiece W, and is adapted to partly direct the laser beam to the mirror 450 where the laser beam is reflected and is directed toward the side W1 of the workpiece W abutting on the fence. The sixth embodiment can attain the same advantages as those of the foregoing embodiments described above.

Figure 14:
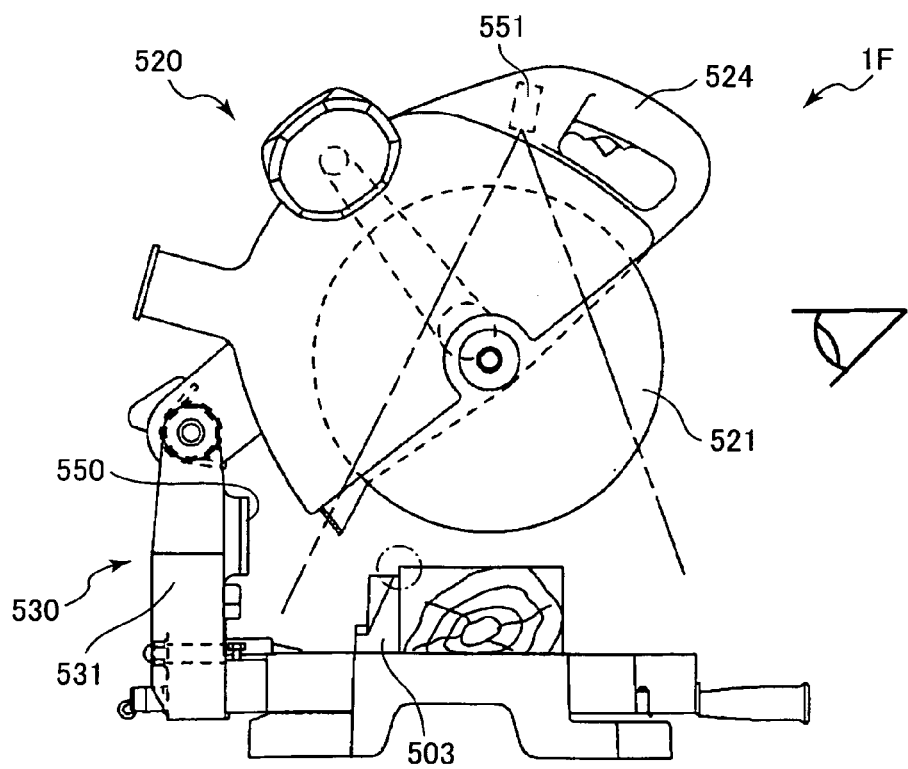
FIG. 14 is a side view of a miter saw according to a seventh embodiment of this invention.
Figure 15:
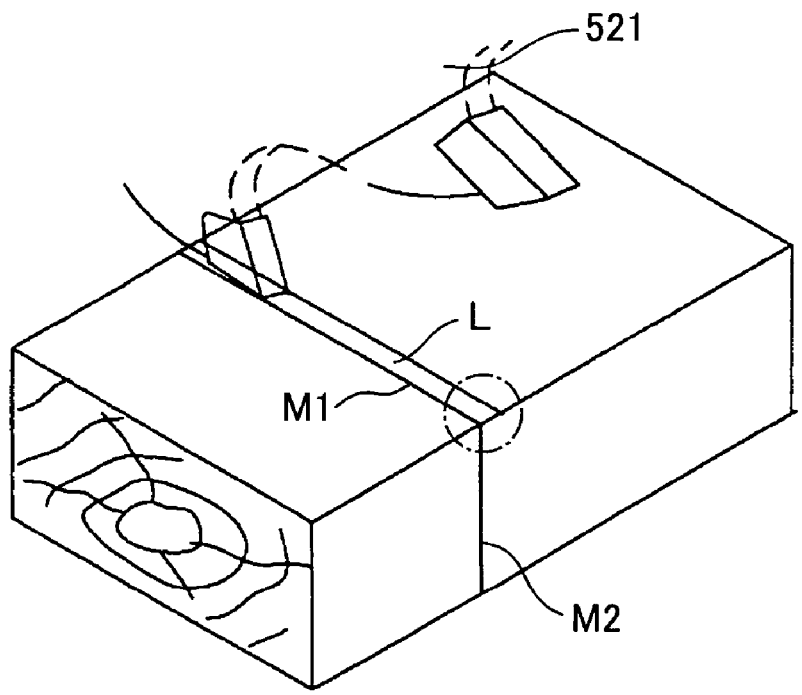
FIG. 15 is a view for description of the positional relation among the cutting line marker marked on a workpiece, a saw blade tip, and a linear image of the saw blade tip projected on the workpiece upon light irradiation in the seventh embodiment of the present invention.

A miter saw 1F according to a seventh embodiment of the present invention is shown in FIGS. 14 and 15. In the seventh embodiment, a light illumination unit 551 is used instead of the laser oscillator as a light-projecting device. The light illumination unit 551 is attached to a handle 524. The light illumination unit 551 is positioned at its uppermost position and is directed downwardly when the cutting unit 520 is positioned at its uppermost position. Further, a mirror 550 is attached to a front side of a holder 531 of a support unit 530. Thus, as shown in FIG. 15, the shadow of the lower tip end of a circular saw blade 521 falls on the upper surface of the workpiece, the shadow forming a line L. The user can therefore easily perceive the positional relation between the saw blade 521 and the cutting line marker M1 marked on the workpiece. Moreover, the user can recognize the positional relation between the rear end of the shadow line on the upper-rear corner of the workpiece (encircled by a one-dotted chain line) and the line marker M2 already marked on the abutting side of the workpiece abuttable on a fence 503, through the images of these line end and the marker M2 those reflected on the mirror 550. Thus, the user can easily align the saw blade with the line marker M2.

While the invention has been described in detail and with reference to the specific embodiments thereof, it would be apparent to those skilled in the art that various changes and modifications may be made therein without departing from the scope of the invention.

For example, in the seventh embodiment shown in FIGS. 14 and 15, a laser oscillator can be provided instead of the light illumination unit 551. Further, positions of the laser oscillator and mirror are not limited to those in the first to seventh embodiments as long as an appropriate laser beam projection line is suitably formed on the surface of the workpiece and the alignment between the line with the cutting line marker can be performed by way of the mirror.

Figure 16:
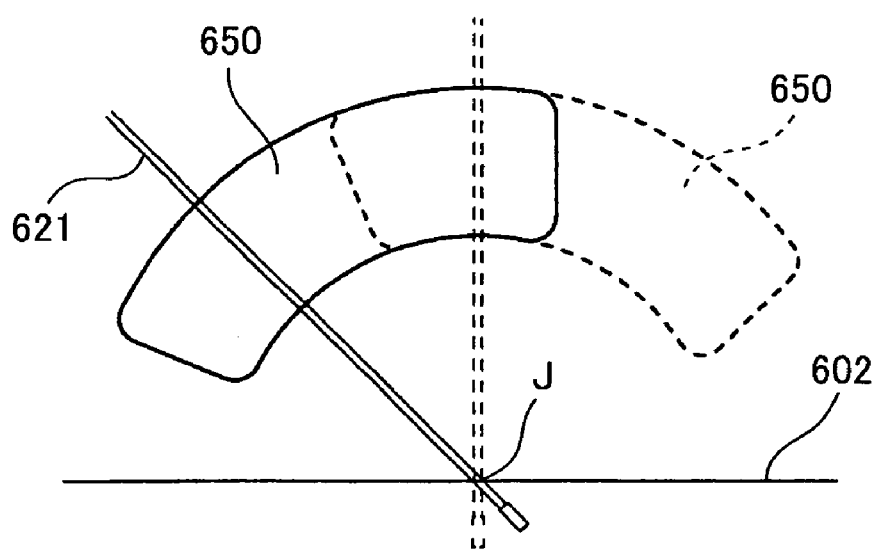
FIG. 16 is a view showing a modification to a mirror that can be used in any one of the embodiments of this invention.
Figure 17:
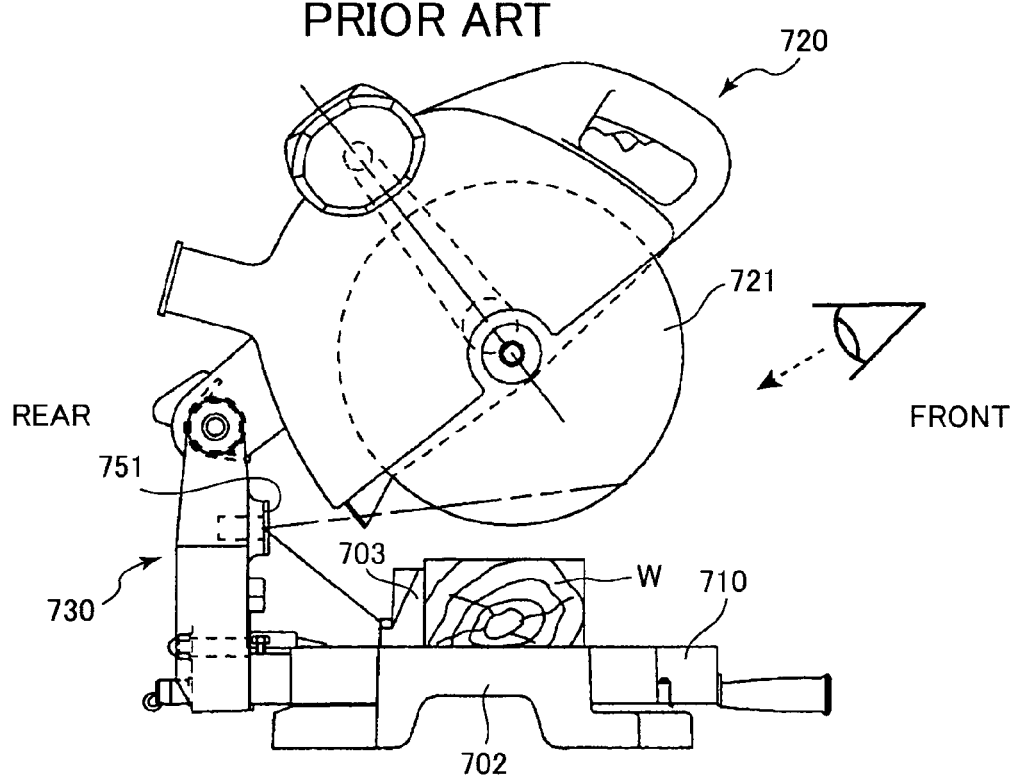
FIG. 17 is a side view of a conventional miter saw in which a workpiece having a rectangular cross-section is set on a base.
Figure 18:
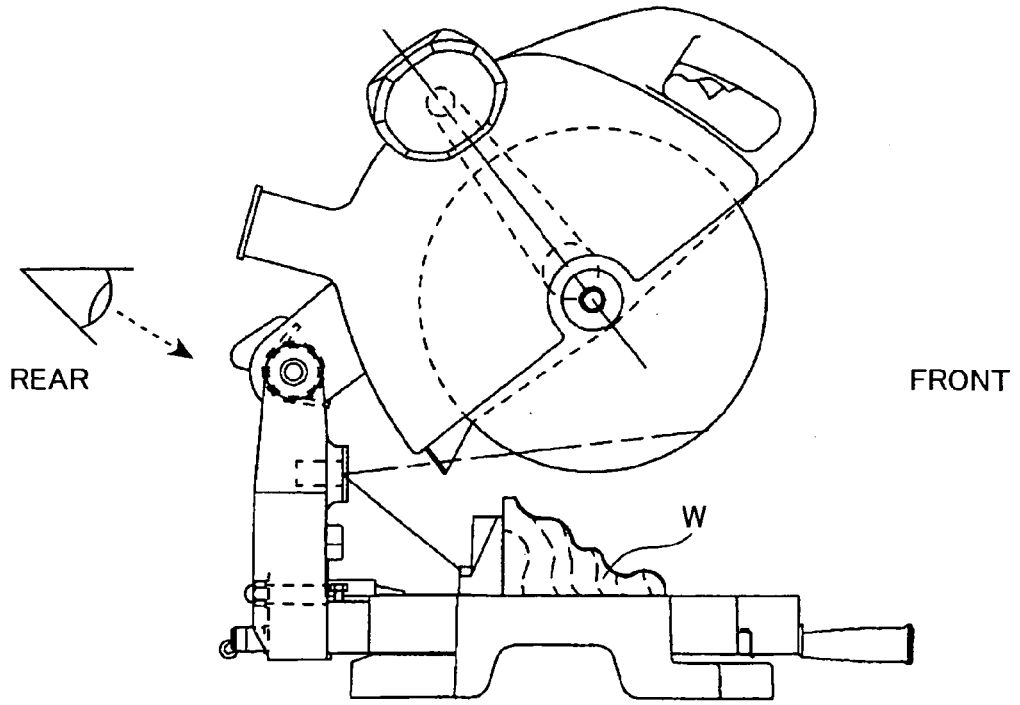
FIG. 18 is a side view of the conventional miter saw in which a workpiece having an irregular cross-section is set on the base.

Further, in the embodiments described above, a laterally elongated mirror 650 elongated in a tilting direction of the cutting unit as shown in FIG. 16 is preferable. By elongating the lateral length of the mirror, a part of the mirror can still be located above an intersection J of a base 602 and a circular saw blade 621 even if the cutting unit is tilted at maximum angle. Then, when the cutting unit stands upright as indicated by a broken line in FIG. 16, the mirror 650 lies at the position indicated by a broken line. In this case, the projected beam line and the cutting line marker can be reflected in a leftward area of the mirror 650. On the other hand, when the cutting unit is tilted toward left as indicated by a solid line in FIG. 16, the mirror 650 is pivotally moved toward the left as indicated by the solid line. In this case, because the mirror 650 is sufficiently long in the tilting direction of the cutting unit, the mirror 650 can still reflect the projected beam line and the cutting line marker. Therefore, when the slant cutting is performed, the mirror can continuously reflect the line and the cutting line marker.

What is claimed is:

1. A miter saw comprising:
    a base;
    a fence secured to the base and having an abutment surface on which a side of a workpiece abuts for positioning the workpiece on the base;
    a cutting unit supporting a circular saw blade which provides a plurality of blade tips;
    a support unit movably supporting the cutting unit above the base;
    a light projecting device that forms a projected line on the workpiece, the line being indicative of a position of a tip of the circular saw blade and a position of an extension of the tip in a diametrical direction of the circular saw blade; and
    a mirror provided at a position in confrontation with the side of the workpiece in abutting contact with the abutment surface of the fence for reflecting the projected line which is projected on the side of the workpiece which is in abutting contact with the abutment surface of the fence and for allowing a reflected line image of the projected line on the abutting contact side of the workpiece to be observed from a front side of the saw.

2. The miter saw as claimed in claim 1, wherein the cutting unit comprises:
    a gear case supported to the support unit and pivotally movable upward and downward, the circular saw blade being rotatably supported by the gear case;
    a saw cover provided integrally with the gear case and opposing the gear case;
    a motor housing provided at a top of the saw cover;

a motor disposed in the motor housing; and a power transmission mechanism provided between the motor and the circular saw blade for transmitting rotation of the motor to the circular saw blade.

3. The miter saw as claimed in claim 1, wherein the cutting unit comprises:

a gear case supported to the support unit and pivotally movable upward and downward, the circular saw blade being rotatably supported by the gear case;

a saw cover opposing the gear case; and a handle provided on the saw cover, the mirror being located below the handle.

4. The miter saw as claimed in claim 1, wherein the light projecting device comprises a light illumination unit mounted on a top portion of the cutting unit.

5. The miter saw as claimed in claim 1, wherein the mirror is positioned rearwardly of the blade guide.

6. The miter saw as claimed in claim 1, further comprising a turntable rotatably mounted on the base for supporting the workpiece in cooperation with the base, the fence extending across the turntable.

7. The miter saw as claimed in claim 6, wherein the mirror is secured to one of the turntable, the cutting unit and the support unit.

8. The miter saw as claimed in claim 6, wherein the fence has another surface opposite to the abutment surface, and wherein the support unit comprises:

a holder upstanding from the turntable at a side in confrontation with the another surface of the fence; and a sliding unit pivotally movably supporting the cutting unit and slidingly movable with respect to the holder in a direction perpendicular to the fence, the mirror being attached to the sliding unit.

9. The miter saw as claimed in claim 6, wherein the fence has another surface opposite to the abutment surface, and wherein the support unit has a base end portion connected to the turntable and upstands from the turntable at a side in confrontation with the another surface of the fence, the support unit being pivotable about the base end portion and movable in an extending direction of the fence.

10. The miter saw as claimed in claim 9, wherein the mirror is provided on the support unit and extends in a direction in which the fence extends with an extending length capable of being located vertically above an intersection between the base and the circular saw blade regardless of any pivotally moving position of the cutting unit in accordance with the pivotal movement of the support unit.

11. The miter saw as claimed in claim 1, wherein the light projecting device comprises a laser oscillator.

12. The miter saw as claimed in claim 11, wherein the laser oscillator is provided at a position in confrontation with the side of the workpiece which abuts on the fence.

13. The miter saw according to claim 12, further comprising a turntable rotatably mounted on the base for supporting the workpiece in cooperation with the base, the fence extending across the turntable;

wherein the fence has another surface opposite to the abutment surface; and wherein the support unit is provided on the turntable at a side of the another surface of the fence, the support unit having one side in confrontation with the fence, and the one side being formed with a recess for accommodating therein the laser oscillator, the recess defining an open end open to the one side; and the miter saw further comprising a cover formed with an opening which allows a laser beam to pass therethrough, the cover being fixed to the one side of the support unit for covering the open end, and the cover having one side serving as the mirror.

14. A miter saw comprising:

a base;

a turntable rotatably mounted on the base for supporting a workpiece, the turntable having an upper surface;

a fence secured to the base and extending across the turntable, the fence having an abutment surface on which a side of the workpiece abuts for positioning the workpiece, the fence comprising a pair offence bodies extending linearly and spaced away from each other to form a space between opposing inner ends of the fence bodies;

a cutting unit supporting a circular saw blade;

a support unit movably supporting the cutting unit to the turntable, the cutting unit being positioned above the turntable;

a blade guide attached to the upper surface of the turntable and formed with a slit allowing the circular saw blade to be entered therein, the slit having a rear end always positioned in alignment with the space regardless of rotation of the turntable; and a mirror provided at a position in confrontation with the side of the workpiece in abutting contact with the abutment surface of the fence for reflecting the rear end of the slit and for enabling a reflected image of the rear end of the slit to be observed from a front side of the saw; and a light projecting device for projecting light so as to form a projected line on the workpiece and the mirror having a reflective surface positioned so that the projected light from the light projecting device does not directly impinge thereon.

15. The miter saw as claimed in claim 1, wherein the mirror is provided with a reflective surface positioned so that light from the light projecting device does not directly impinge on the light reflective surface thereof.

16. The miter saw as claimed in claim 14, wherein the mirror has a substantially planar reflective surface.

* * * * *